United States Patent
Tsunoda

(10) Patent No.: US 6,690,318 B1
(45) Date of Patent: Feb. 10, 2004

(54) CELLULAR RADAR

(75) Inventor: Stanley I. Tsunoda, Encinitas, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/330,656

(22) Filed: Dec. 27, 2002

(51) Int. Cl.⁷ .............................................. G01S 13/93
(52) U.S. Cl. ...................... 342/59; 342/126; 342/160; 342/450
(58) Field of Search ............................ 342/59, 74, 126, 342/148, 158, 160, 450; 340/3.1, 541, 552, 825

(56) References Cited

U.S. PATENT DOCUMENTS

| | | | |
|---|---|---|---|
| 4,728,959 A | | 3/1988 | Maloney et al. |
| 4,760,381 A | * | 7/1988 | Haag .......................... 340/556 |
| 5,448,243 A | * | 9/1995 | Bethke et al. ................. 342/59 |
| 5,528,244 A | * | 6/1996 | Schwab ........................ 342/37 |
| 5,583,517 A | | 12/1996 | Yokev et al. |
| 5,596,330 A | | 1/1997 | Yokev et al. |
| 6,094,169 A | * | 7/2000 | Smith et al. ................. 342/465 |
| 6,211,811 B1 | * | 4/2001 | Evers ........................... 342/36 |
| 6,448,929 B1 | * | 9/2002 | Smith et al. ................. 342/456 |
| 2001/0022558 A1 | * | 9/2001 | Karr et al. ................... 342/450 |

FOREIGN PATENT DOCUMENTS

EP          466239 A1 *   1/1992   ........... G01S/13/76

* cited by examiner

Primary Examiner—Thomas H. Tarcza
Assistant Examiner—Isam Alsomiri
(74) Attorney, Agent, or Firm—Nydegger & Associates

(57) ABSTRACT

A cellular radar system is disclosed for detecting and tracking objects in a surveillance area that is divided into cells. Each cell is scanned by at least two radars to produce two (or more) respective datastreams for the cell. Orbiting unmanned air vehicles can be used as radar platforms. The resulting datastreams for each cell are then multilaterated by a processor to produce a multilaterated datastream for each cell. The multilaterated datastreams for all cells are then combined by the processor and the resulting data used to detect or track one or more objects in the surveillance area. The fused multilaterated datastreams allow objects to be tracked as they move from cell to cell.

20 Claims, 3 Drawing Sheets

CELLULAR RADAR

FIELD OF THE INVENTION

The present invention pertains generally to radar systems and methods. More particularly, the present invention pertains to radar systems and methods for wide area surveillance including targeting/tracking of multiple, stationary and moving objects. The present invention is particularly, but not exclusively, useful for wide area surveillance with a plurality of close-range radars.

BACKGROUND OF THE INVENTION

Wide area radar surveillance has both military and commercial applications. Military applications of wide area radar surveillance typically include detecting and tracking hostile forces including fast moving vehicles, and guiding weapons to target. Typical commercial applications of wide area radar surveillance can include traffic flow monitoring, and search and rescue.

For all the above-described applications, it would be desirable to have a high-resolution radar system that can detect and track multiple objects including stationary and fast moving objects. Further, a desirable system would be effective in all types of terrain and weather conditions. For a relatively small surveillance area (e.g. 400 km$^2$), these objectives have heretofore been achieved using a single, close range radar. For example, a manned or unmanned surveillance aircraft equipped with a close range radar can be stationed in tight orbit over the small surveillance area and used to detect and track stationary and fast moving objects. Although this arrangement has provided reasonable resolution in all types of terrain and in adverse weather, the size of the surveillance area has been limited.

An additional drawback associated with the use of a single, close range radar concerns the tracking of fast moving objects. Specifically, if a tracked object leaves the small surveillance area, the surveillance aircraft must follow the object or discontinue tracking. If the surveillance aircraft follows the moving object, the surveillance aircraft may have to discontinue surveillance of other objects in the original surveillance area. Furthermore, following the object requires a fast moving, agile radar platform, increasing system cost and complexity.

In addition to the above-described deficiencies, the use of a single close range radar to scan a surveillance area provides only reasonable resolution. On the other hand, when two or more radars are used to scan a surveillance area, the resultant radar datastreams can be multilaterated using signal processing techniques to reduce azimuthal geolocation error and increase resolution. However, effective multilateration requires the angle between the horizontal components of the radar beams (i.e. the multilateration angle) to deviate from zero degrees (0°) and one hundred eighty degrees (180°). One way to ensure that a proper multilateration angle is maintained is to synchronize the movements of the radar platforms. Of course, platform synchronization increases system complexity and cost.

In light of the above, it is an object of the present invention to provide radar systems and methods for wide area surveillance and targeting/tracking of stationary and moving objects within the surveillance area. It is another object of the present invention to provide radar systems and methods for wide area surveillance that are effective in all types of terrain and in adverse weather. It is yet another object of the present invention to provide radar systems and methods for wide area surveillance having resolutions that are substantially equivalent to the resolutions obtainable with multilaterated, close range radar systems. Yet another object of the present invention is to provide radar systems and methods for wide area surveillance that are capable of tracking an object moving through the surveillance area without following the object with a radar platform. Still another object of the present invention is to provide radar systems and methods for wide area surveillance which achieve good multilateration without synchronizing the movements of the radar platforms. It is still another object of the present invention is to provide radar systems and methods for wide area surveillance that have minimal system complexity, are relatively simple to implement, and comparatively cost effective.

SUMMARY OF THE INVENTION

The present invention is directed to a system and method for detecting and tracking an object in a surveillance area. For the present invention, the surveillance area is partitioned into a plurality of cells. Each cell is scanned contemporaneously by at least two radars to produce two (or more) respective datastreams for the cell. The resulting datastreams for each cell are then combined by a processor to produce a multilaterated datastream for each cell. The multilaterated datastreams for all cells are subsequently combined and the resulting data used to detect and track one or more objects in the surveillance area.

In a particular embodiment of the present invention, the surveillance area is divided into hexagonally shaped cells. In this embodiment, a plurality of unmanned air vehicles (UAV), each equipped with Ground Moving Target Indicator (GMTI) radar, are provided one UAV for each hexagonally shaped cell. In greater detail, each GMTI radar equipped UAV is instructed to tightly orbit over the center of one hexagonally shaped cell. While orbiting the center of the cell, each GMTI radar equipped UAV scans two adjacent cells. As explained further below, this cooperation of structure allows each cell to be scanned contemporaneously by two different radars. Additionally, this cell geometry and radar positioning scheme provides good multilateration because the horizontal components of the radar beams within a cell cannot be co-linear. Also, as detailed further below, this geometry allows the orbit of one GMTI radar equipped UAV to be asynchronous relative to the orbit of the other GMTI radar equipped UAV's without degrading the multilateration angle.

In this particular embodiment, synthetic aperture radar (SAR) can be used in addition to the GMTI radar to produce a stationary image of the surveillance area and to periodically check for stopped vehicles. In one implementation, two SAR radars are used for a six cell surveillance area, with the SAR radars mounted on UAV's that orbit at a higher elevation above the surveillance area than the GMTI radar equipped UAV's. As intended for the resent invention, the GMTI radar can be operated in a coarse resolution ode for use in multilateration of the entire cell or a high-range resolution mode (HRR) for aid in classifying, identifying and/or tracking a detected object. In a low system bandwidth implementation of the present invention, the HRR mode GMTI and the SAR time-share a common frequency band while a separate frequency is assigned to each radar for coarse resolution mode GMTI.

Datastreams from each radar are sent via high-speed datalink to a Data Control Manager (DCM), which performs multilateration for all cells. The DCM then mosaics and fuses the multilaterated datastreams, allowing objects to be tracked as they move from cell to cell. Specifically, the DCM can extrapolate an object's position based on the object's kinematics to determine when an object has crossed a cell boundary and entered a new cell. The DCM then detects the object in the new cell's multilaterated datastream. This process can be confirmed using HRR mode radar. The high-speed datalink between the DCM and radars can also be used to direct the radars for targeting, to monitor and control the UAV orbits, and to direct weapons. Ground control stations (GCS) are provided for routine control and status of the UAV's and radars via a moderate speed datalink. A network connects each GCS in communication with the DCM.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
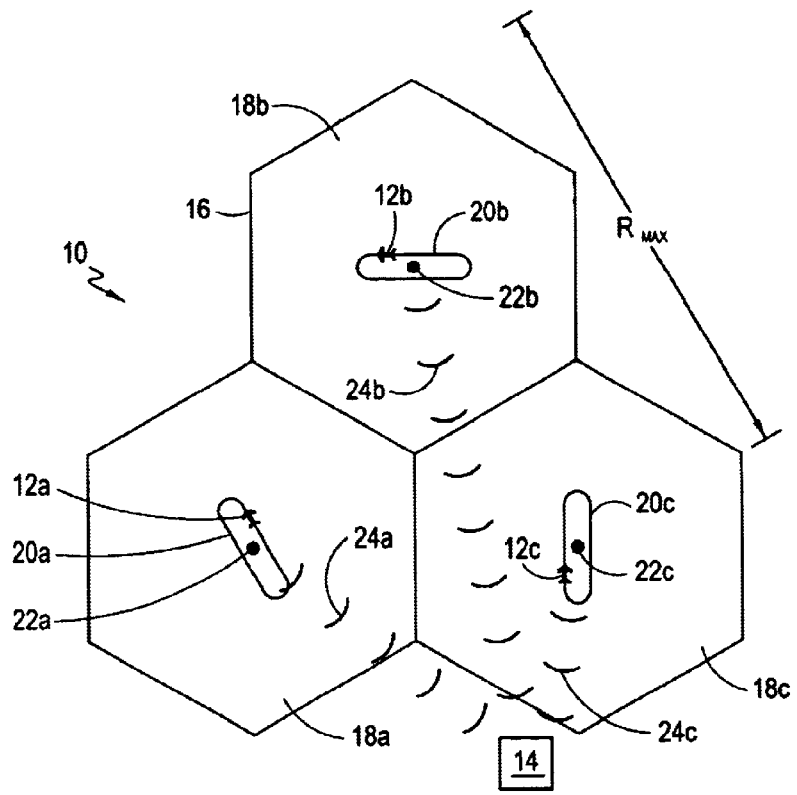
FIG. 1 is a schematic diagram of a cellular radar system for the present invention shown for a surveillance area having three hexagonally shaped cells.

Referring initially to FIG. 1, a cellular radar system in accordance with the present invention is shown and generally designated 10. As shown in FIG. 1, the system 10 includes a plurality of radar equipped air vehicles 12a–c and a base site 14. More specifically, in a particular embodiment of the present invention, each vehicle 12 includes a close range, GMTI radar which can have both a coarse resolution mode and a high-range resolution mode (HRR). In functional overview, the system 10 is provided to detect and track one or more objects in a surveillance area 16.

For the particular embodiment shown in FIG. 1, the surveillance area 16 is partitioned into three hexagonally shaped cells 18a–c. Although three hexagonally shaped cells 18a–c are shown, it is to be appreciated that more or less than three cells 18 can be used, and that cells 18 that are not hexagonally shaped can be used. For the embodiment shown in FIG. 1, a radar equipped air vehicle 12a–c is placed in a tight racetrack orbit 20a–c about the center 22a–c of a respective cell 18a–c. Suitable radar equipped air vehicles 12a–c can include, but are not limited to manned aircraft and unmanned air vehicles (UAV). For the embodiment shown in FIG. 1, the vehicles 12 are not required to follow or pursue objects in the surveillance area 16. To the contrary, the vehicles 12 are only required to loiter around the centers 22a–c of the cells 18a–c, and thus, the vehicles 12 do not necessarily need to be particularly fast or agile. The size of the cells, 18 as defined by $R_{MAX}$ shown in FIG. 1, is a function of the minimum acceptable depression angle and the elevation of the radar equipped air vehicles 12a–c. The minimum acceptable depression angle depends on the type of terrain one wishes to surveil. Hilly, or mountainous terrain, for example, requires steep depression angles.

In operation, each GMTI radar equipped vehicle 12 orbits the center 22 of a respective cell 18 and radar scans two adjacent cells 18. In greater detail, for the embodiment shown in FIG. 1, vehicle 12a orbits the center 22a of cell 18a and radar scans adjacent cell 18b and adjacent cell 18c. Contemporaneously, vehicle 12b orbits the center 22b of cell 18b and radar scans adjacent cell 18a and adjacent cell 18c. Also contemporaneously, vehicle 12c orbits the center 22c of cell 18c and radar scans adjacent cell 18a and adjacent cell 18b. Thus, this cooperation of structure allows each cell 18a–c to be scanned contemporaneously by two different radars.

With continued reference to FIG. 1, it is to be appreciated that the scanning of cell 18a by radar equipped air vehicle 12b produces a first datastream for the cell 18a and the scanning of cell 18a by radar equipped air vehicle 12c produces a second datastream for the cell 18a. These two datastreams are then communicated via communication links 24b and 24c respectively to base station 14. At base station 14, the two datastreams for cell 18a are then analyzed by a processor to produce multilaterated target tracks for cell 18a. As indicated above, multilateration can be used to reduce azimuthal geolocation error and increase the resolution of the system 10. In a similar manner, two datastreams are produced for cell 18b by radar equipped air vehicle 12a and radar equipped air vehicle 12c. These two datastreams are then communicated via communication links 24a and 24c to base station 14 for multilateration analysis. Also in a similar manner, two datastreams are produced for cell 18c by radar equipped air vehicle 12a and radar equipped. air vehicle 12b. These two datastreams are then communicated via communication links 24a and 24b to base station 14 for multilateration analysis. The three multilaterated target tracks for cells 18a–c are then combined and used to track one or more objects in the surveillance area 16.

The geometry of the cells 18a–c and the positioning of the radar equipped air vehicles 12a–c proximate to the centers 22a–c for the embodiment shown in FIG. 1 provides for good multilateration. In greater detail, it can be seen from FIG. 1 that the horizontal component of the radar beam from vehicle 12b in cell 18a is never co-linear with the horizontal component of the radar beam from vehicle 12c. It is to be appreciated that this analysis extends to cells 18b and 18c. FIG. 1 shows an "independent" trio of cells. Such trios may be added together to cover arbitrarily shaped areas. It is to be further appreciated that for the geometry shown in FIG. 1 that good multilateration is maintained without orbit synchronization of the vehicles 12a–c.

Figure 2A:
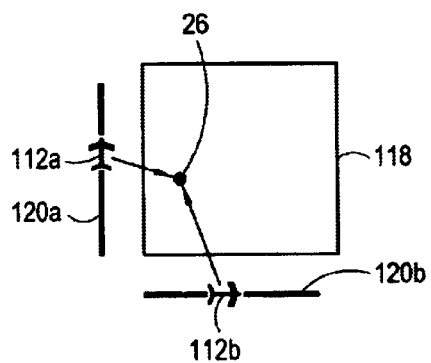
FIG. 2A is a schematic diagram of two radars aimed at a target in a square shaped cell, showing the radars at positions wherein system resolution is significantly increased due to good multilateration.
Figure 2B:
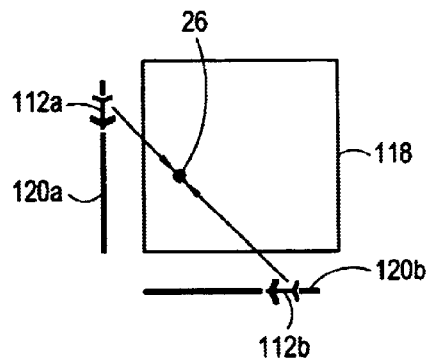
FIG. 2B is a schematic diagram of two radars aimed at a target in a square shaped cell, showing the radars at positions wherein little or no benefit from multilateration is obtained.

In contrast, FIGS. 2A and 2B illustrate that for a square shaped cell 118 scanned broadside by radar equipped vehicles 112a,b traveling adjacent the edges of the cell 118 along respective paths 120a,b, vehicle synchronization is required to maintain good multilateration. In greater detail, FIG. 2A shows the vehicles 112a,b positioned for good multilateration of target 26 (i.e. the horizontal components of the radar beams from vehicle 112a,b are not colinear).

With this positioning, the intersection between areas (which are typically ellipses) representing the azimuthal geolocation error for each vehicle 112a,b can be found using multilateration to increase overall resolution. On the other hand, in the absence of synchronization, vehicles 112a,b may assume the positions shown in FIG. 2B wherein little or no benefit from multilateration for the target 26 is obtained because the horizontal components of the radar beams from vehicle 112a,b are co-linear.

Figure 3:
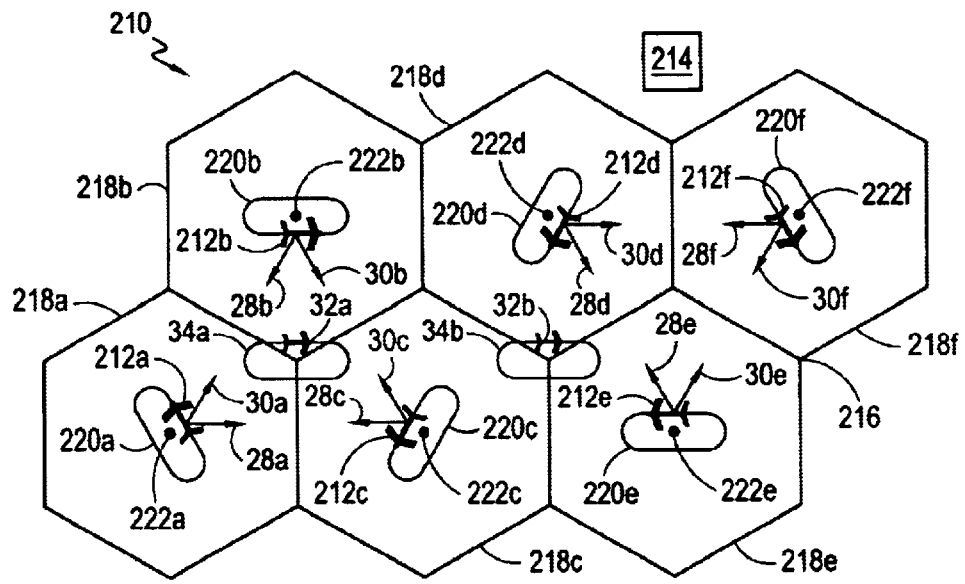
FIG. 3 is a schematic diagram of a radar system for the present invention shown for a surveillance area having six hexagonally shaped cells.

Referring now to FIG. 3, a cellular radar system 210 is shown for a surveillance area 216 partitioned into six hexagonally shaped cells 218a–f. As further shown, the system 210 includes a plurality of radar equipped air vehicles 212a–f and a base site 214. In this embodiment, each vehicle 212 includes a close range, GMTI radar which can have both a coarse resolution mode and a high-range resolution mode (HRR). Like the embodiment shown in FIG. 1, each radar equipped air vehicle 212a–f is placed in a tight racetrack orbit 220a–f (shown as a single line for clarity) about the center 222a–f of a respective cell 218a–f.

In operation, each GMTI radar equipped vehicle 212a–f orbits the center 220a–f of a respective cell 218a–f and radar scans two adjacent cells 218a–f (as indicated by the directional arrows 28a–f, 30a–f) producing a datastream for each scanned cell 218a–f. For example, GMTI radar equipped vehicle 212d orbits the center 222d of a cell 218d and radar scans cell 218e and cell 218f. It therefore follows that the GMTI radar equipped vehicles 212a–f generate two datastreams for each cell 218a–f. These datastreams are then communicated to base station 214 where a multilaterated datastream is produced for each cell 218a–f. If desired, the radar beam of a GMTI radar equipped vehicles 212a–f can be redirected to allow for trilateration of (or within) a selected cell 218a–f. For example, GMTI radar equipped vehicle 212c can be instructed to scan adjacent cell 218e to thereby allow for trilateration of cell 218e via radar from vehicles 212c, 212d and 212f. It is to be appreciated that trilateration can provide a further reduction in azimuthal geolocation error and thus higher resolution than multilateration with only two datastreams.

In the FIG. 3 embodiment, synthetic aperture radar (SAR) equipped vehicles 32a, 32b are placed in orbits 34a, 34b in the surveillance area 216 to produce a stationary image of the surveillance area 216 and to periodically check for stationary targets such as stopped vehicles. In one implementation, the orbits 34a, 34b of the SAR equipped vehicles 32a, 32b are positioned at a higher elevation above the surveillance area 216 than the orbits 220a–f of the GMTI radar equipped vehicles 212a–f. Accordingly, if desired, an SAR equipped vehicle 32a, 32b may orbit directly over a GMTI radar equipped vehicle 212a–f.

Figure 4:
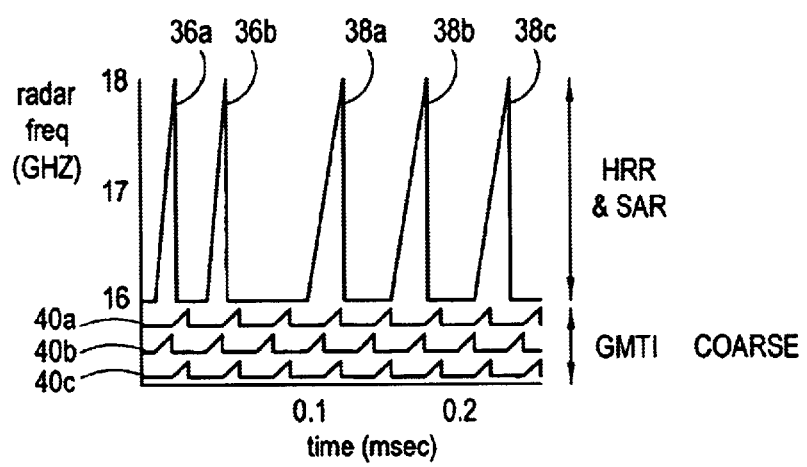
FIG. 4 is a frequency use timeline showing a suitable radar mode spectrum distribution to reduce system bandwidth.

Referring now to FIG. 4, a frequency use timeline showing a suitable radar mode spectrum distribution is shown. As intended for the present invention, the GMTI radar can be operated in a coarse resolution mode for use in multilateration of the entire cell or a high-range resolution mode (HRR) for tracking a detected object. HRR can be used to assist tracking and to sort out target mis-associates to include mis-associations of target vehicles at road intersections or other vehicle crossings. As shown in FIG. 4, the HRR mode GMTI (i.e. waveforms 36a,b) and SAR (i.e. waveforms 38a–c) time-share a common frequency band to lower system bandwidth, while a separate frequency is preferably assigned to each radar for coarse resolution mode GMTI (i.e. waveforms 40a–c). This scheme prevents a radar from receiving unintended return pulses from another radar in the cellular network.

Figure 5:
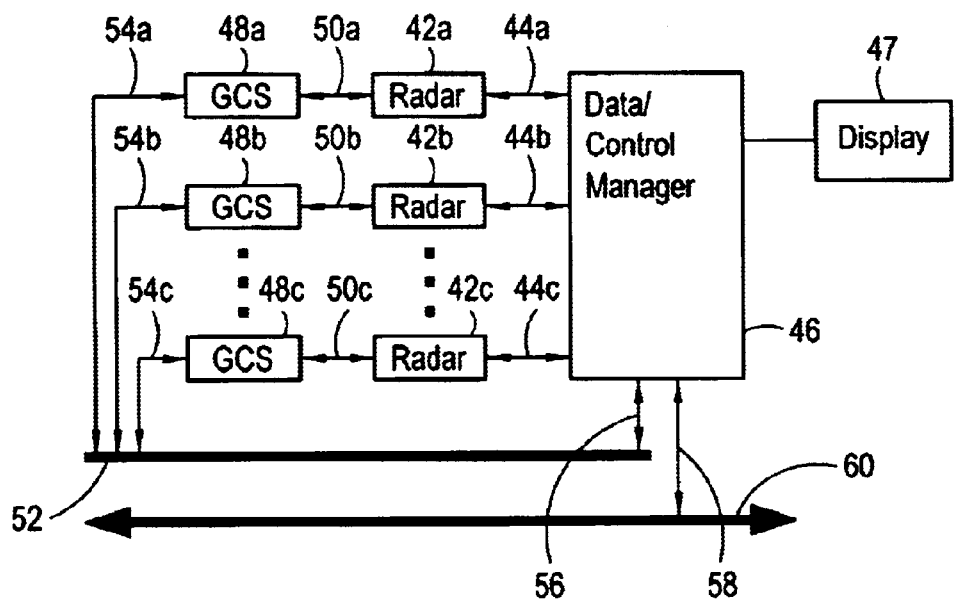
FIG. 5 is a schematic component diagram of a portion of a cellular radar system for the present invention showing information flow between the components.

FIG. 5 shows a suitable information flow architecture for the present invention showing information flow between the components. Datastreams from each radar 42a–c are sent via respective high-speed datalink 44a–c to Data Control Manager (DCM 46), which performs multilateration for all cells. The DCM 46 then mosaics the multilaterated GMTI and SAR datastreams and fuses the data. The fused data can then be used to track target objects as they move from cell to cell and can be viewed by personnel via display 47. Specifically, the DCM 46 can be configured to extrapolate a target object's position based on the target object's kinematics to determine when a target object has crossed a cell boundary and entered a new cell. The DCM 46 then detects the target object in the new cell's multilaterated datastream. This process can be confirmed using HRR mode radar.

The DCM 46 also can monitor the orbits of the radar platforms and send targeting information via high-speed datalink 44a–c to the radar platforms for purposes including, but not limited to, redirecting the radar 42a–c and directing weapons to target. FIG. 5 also shows that Ground Control Stations (GCS 48a–c) are provided for routine control and status of the radars 42a–c and radar platforms via a moderate speed datalink 50a–c. As further shown, each GCS 48a–c is in communication with network 52 via moderate speed datalinks 54a–c, and cellular system network 52 is connected via moderate speed datalink 56 with the DCM 46. DCM 46 can be connected via moderate speed datalinks 58 to an existing network 60 such as an existing commercial or military network (e.g. JTIDS/Link 16) if desired.

While the particular Cellular Radar as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for detecting an object in a surveillance area, said method comprising the steps of:

partitioning the surveillance area into a plurality of cells;

radar scanning each said cell with at least two radars to produce at least two respective radar datastreams for each cell;

multilaterating said radar datastreams for each said cell to produce a multilaterated datastream for each said cell;

combining said multilaterated datastreams; and using said combined multilaterated datastreams to detect an object in the surveillance area.

2. A method as recited in claim 1 wherein each said cell is hexagonally shaped.

3. A method as recited in claim 2 wherein said radar scanning step comprises the step of simultaneously orbiting about the center of each hexagonally shaped cell with a radar equipped unmanned air vehicle, with each said radar equipped unmanned air vehicle scanning two adjacent hexagonally shaped cells.

4. A method as recited in claim 1 wherein said step of radar scanning each cell with at least two radars is accomplished with at least two radar-equipped unmanned air vehicles.

5. A method as recited in claim 1 wherein said radar scanning step is accomplished using radar in ground moving target indication (GMTI) mode.

6. A method as recited in claim 5 further comprising the step of radar scanning the surveillance area with a radar in synthetic aperture radar (SAR) mode to create a stationary image for the surveillance area and the step of using said stationary image with said multilaterated datastreams to detect an object in the surveillance area.

7. A method as recited in claim 1 further comprising the step of radar scanning in at least one said cell using radar in high-range resolution (HRR) mode.

8. A system for detecting an object in a surveillance area made up of a plurality of cells, said system comprising:

a plurality of radars, each radar for scanning at least one cell and creating a datastream for each cell scanned;

a plurality of radar positioning means, each said radar positioning means for maintaining a said radar at positions to allow at least two cells to each be scanned by at least two said radars to produce at least two respective datastreams for each cell;

means for multilaterating datastreams to produce a multilaterated datastream for each cell; and means for displaying said multilaterated datastreams to provide an indication of the object in the surveillance area.

9. A system as recited in claim 8 wherein at least one said radar positioning means comprises an unmanned air vehicle (UAV).

10. A system as recited in claim 8 wherein each said radar is configurable into a ground moving target indication (GMTI) mode and a high-range resolution mode (HRR).

11. A system as recited in claim 8 wherein said means for multilaterating datastreams comprises a computer processor.

12. A system as recited in claim 8 wherein said means for multilaterating datastreams comprises a computer processor located at a base site and wherein said system further comprises a plurality of high speed links for communication between said plurality of radars and said base station.

13. A system as recited in claim 8 wherein at least one said radar is configurable into a synthetic aperture radar (SAR) mode.

14. A method for detecting an object in a surveillance area, said method comprising the steps of:

dividing the surveillance area into a plurality of cells;

providing a plurality of radar equipped air vehicles;

radar scanning each cell with at least two radar equipped air vehicles to produce at least two respective radar datastreams for each cell; and using said radar datastreams for each cell to provide an indication of the object in the surveillance area.

15. A method as recited in claim 14 wherein each said cell is hexagonally shaped.

16. A method as recited in claim 15 wherein said radar scanning step comprises the step of simultaneously orbiting about the center of each hexagonally shaped cell with a said radar equipped air vehicle, with each said radar equipped air vehicle scanning two adjacent hexagonally shaped cells.

17. A method as recited in claim 14 wherein at least one said radar equipped air vehicle is unmanned.

18. A method as recited in claim 14 wherein said radar equipped air vehicles are unmanned.

19. A method as recited in claim 14 wherein said radar scanning step is accomplished using radar in ground moving target indication (GMTI) mode.

20. A method as recited in claim 19 further comprising the step of radar scanning the surveillance area with a radar in synthetic aperture radar (SAR) mode to create a stationary image for the surveillance area and the step of using said stationary image with said multilaterated datastreams to detect an object in the surveillance area.

* * * * *

UNITED STATES PATENT AND TRADEMARK OFFICE
CERTIFICATE OF CORRECTION

PATENT NO.    : 6,690,318 B1
DATED         : February 10, 2004
INVENTOR(S)   : Stanley I. Tsunoda It is certified that error appears in the above-identified patent and that said Letters Patent is hereby corrected as shown below:

Column 2,
Line 56, delete "resent" insert -- present --
Line 57, delete "ode" insert -- mode --

Column 4,
Line 41, delete "equipped." insert -- equipped --

Signed and Sealed this

Twenty-second Day of June, 2004

JON W. DUDAS
*Acting Director of the United States Patent and Trademark Office*